United States Patent [19]

Rath

[11] Patent Number: 4,700,813

[45] Date of Patent: Oct. 20, 1987

[54] WHEEL ASSEMBLY INCLUDING A DISC BRAKE FOR VEHICLES

[75] Inventor: Heinrich B. Rath, Vallendar, Fed. Rep. of Germany

[73] Assignee: Lucas Industries public limited company, Birmingham, England

[21] Appl. No.: 826,487

[22] PCT Filed: May 24, 1985

[86] PCT No.: PCT/EP85/00252

§ 371 Date: Jan. 28, 1986

§ 102(e) Date: Jan. 28, 1986

[87] PCT Pub. No.: WO85/05661

PCT Pub. Date: Dec. 19, 1985

[30] Foreign Application Priority Data

Jun. 5, 1984 [DE] Fed. Rep. of Germany ....... 8417138

[51] Int. Cl.⁴ .................. B60T 1/06; F16D 55/02; F16D 65/78; A63C 17/12
[52] U.S. Cl. ................. 188/18 A; 188/71.6; 188/264 AA; 301/6 CS
[58] Field of Search .............. 188/18 R, 18 A, 17, 188/218 R, 264 AA, 71.6, 71.1, 151 R, 152, 356, 361, 370, 368; 301/6 CS, 108 A; 192/70.12, 113 A

[56] References Cited

U.S. PATENT DOCUMENTS

| 2,646,862 | 7/1953 | Dodge | 301/6 CS |
| 3,051,271 | 8/1962 | Spannagel et al. | 188/18 A |
| 3,623,774 | 11/1971 | Funke et al. | 301/6 CS |
| 4,226,304 | 10/1980 | Erdmann | 188/18 A |

FOREIGN PATENT DOCUMENTS

| 1069478 | 11/1959 | Fed. Rep. of Germany . |
| 3009006 | 9/1981 | Fed. Rep. of Germany . |
| 0275132 | 8/1927 | United Kingdom . |

*Primary Examiner*—Andres Kashnikow
*Assistant Examiner*—Robert J. Oberleitner
*Attorney, Agent, or Firm*—Scrivener and Clarke

[57] ABSTRACT

The disc brake comprises a cup-shaped disc carrier (20) which has a base member (22) secured to a wheel hub (14) and a drum-type member (24) extending axially inwardly at a small radial spacing from a wheel rim (30) and being firmly connected to the radially outer edge (48) of a brake disc (50). A stationary wheel bearing box (10) supports a brake caliper (54) which straddles the radially inner edge of the brake disc (50), supports brake pads (60) disposed at either side of the brake disc, and comprises an acutating device (62) at least at one side of the brake disc (50). The base member (22) of the disc carrier (20) is designed as a web of the wheel. The wheel rim (30) has a foot portion (38) which is fixed to the radially outer edge of the base member (22). The vent passages (26) begin at the base member (22) near the wheel hub (14) and near the foot portion (38) of the rim.

6 Claims, 3 Drawing Figures

WHEEL ASSEMBLY INCLUDING A DISC BRAKE FOR VEHICLES

The invention relates to a wheel assembly including a disc brake for vehicles, consisting of a cup-shaped disc carrier which has a base member secured to a wheel hub, and a drum-type member extending axially inwardly at a small radial spacing from a wheel rim and being firmly connected to the radially outer edge of a brake disc, a brake caliper supported at a stationary wheel bearing box, straddling the radially inner edge of the brake disc, supporting brake pads disposed at either side of the brake disc, and comprising an actuating device at least at one side of the brake disc, and vent passages radially within the wheel rim.

In the case of a known wheel assembly of this kind (GB-A 897 619) the cup-shaped disc carrier is designed to be totally separate from the corresponding wheel and its base member is clamped between the wheel hub and a central portion of a wheel web which is pressed in conventional manner of sheet metal and bolted to the hub of the wheel. The brake disc extends radially inwardly from the edge of the drum-type member, but it includes an annular arrangement of vent holes which is located outside of this edge and ventilation blades serving to produce a flow of air which is to pass between the wheel rim and the outside wall of the drum-type member and to leave the wheel assembly through holes formed in the outer area of the wheel web. Hereby part of the heat generated upon braking at the brake disc and taken up by the drum-type member is to be dissipated by the stream of air. However, it was found that an accumulation of heat at the cup-shaped disc carrier cannot be avoided by these measures upon extended and more vigorous braking so that there is a risk of undue heating occurring not only of the brake itself but, under adverse circumstances, also of the wheel rim and, by way of the wheel hub, of an adjoining wheel bearing.

It is, therefore, the object of the invention to develop a wheel assembly including a disc brake such that the risk of overheating is reduced.

This object is met, in accordance with the invention, in a wheel assembly of the kind specified initially in that the base member of the disc carrier is of double wall design and has an inner chamber which is subdivided into vent passages by ventilation blades which are at least approximately radial.

In this manner the heat transmitted from the brake disc to the drum-type member is dissipated so quickly to the ambient atmosphere by the well aerated base member that the entire disc carrier and consequently also the wheel hub and the wheel bearing are kept relatively cool. Also the disc brake which is arranged substantially within the annular space enclosed by these structural members is prevented from becoming overheated by the measures of the invention better than before. The same is true of the wheel rim to which the disc carrier, remaining relatively cool, transmits correspondingly less heat by radiation and conduction than before. Moreover, the base member of the disc carrier designed in accordance with the invention comprises a greater mass and, therefore, has greater thermal capacity than before so that it can accommodate great quantities of heat from the brake disc within a short time, upon vigorous braking, and dissipate and irradiate the same gradually to the surroundings.

An embodiment of the invention is characterized in that the base member proper of the disc carrier is designed as web of the wheel, that the wheel rim comprises a foot portion which is fixed to the radially outer edge of the base member, and that the vent passages in the base member begin in the range of the wheel hub and terminate near the foot portion.

In the case of a second embodiment of the invention the base member of the disc carrier is arranged axially within an independent wheel web, as with the state of the art assumed to be known. Further substantially radial vent passages are formed between the base member which is double-walled in accordance with the invention, and the wheel web. It is particularly convenient with this second embodiment if the further vent passages begin at the axially outer side of the wheel web and also end there and if they are separated from one another by ventilation blades formed at the axially inner side of the web of the wheel and extending at least approximately up to the double-walled base member. In operation, fresh air is sucked in through these vent passages from the axially outer side of the wheel web and passed directly along the outer wall of the double-walled base member whereby the base member is cooled particularly effectively. The ventilation blades formed at the axially inner side of the wheel web provide more effective stiffening of the wheel web than would be obtainable by fins of comparable dimensions disposed at the outside of the wheel web. The outside of the wheel web may be entirely smooth so as to offer little resistance to the relative wind.

Both embodiments mentioned of the invention may be developed further in that the disc carrier together with the wheel rim and an axially inner wall fixed to the wheel bearing box define a space which contains the brake disc and at least a substantial part of the brake caliper and is connected to a vent pipe. The vent pipe assures forced cooling of the space mentioned. To this end the vent pipe for instance may be connected to a fan or an intake manifold of an internal combustion engine or to a venturi pipe in an exhaust system.

In the case of the further development mentioned last the axially inner wall may comprise a collar which encloses the radially outer edge of the brake disc and the adjoining area of the drum-type member. This affords even better protection of the wheel rim from heat radiated by the brake disc and the neighboring region of the drum-type member.

Embodiments of the invention will be described further below with reference to diagrammatic drawings, in which.

Figure 1:
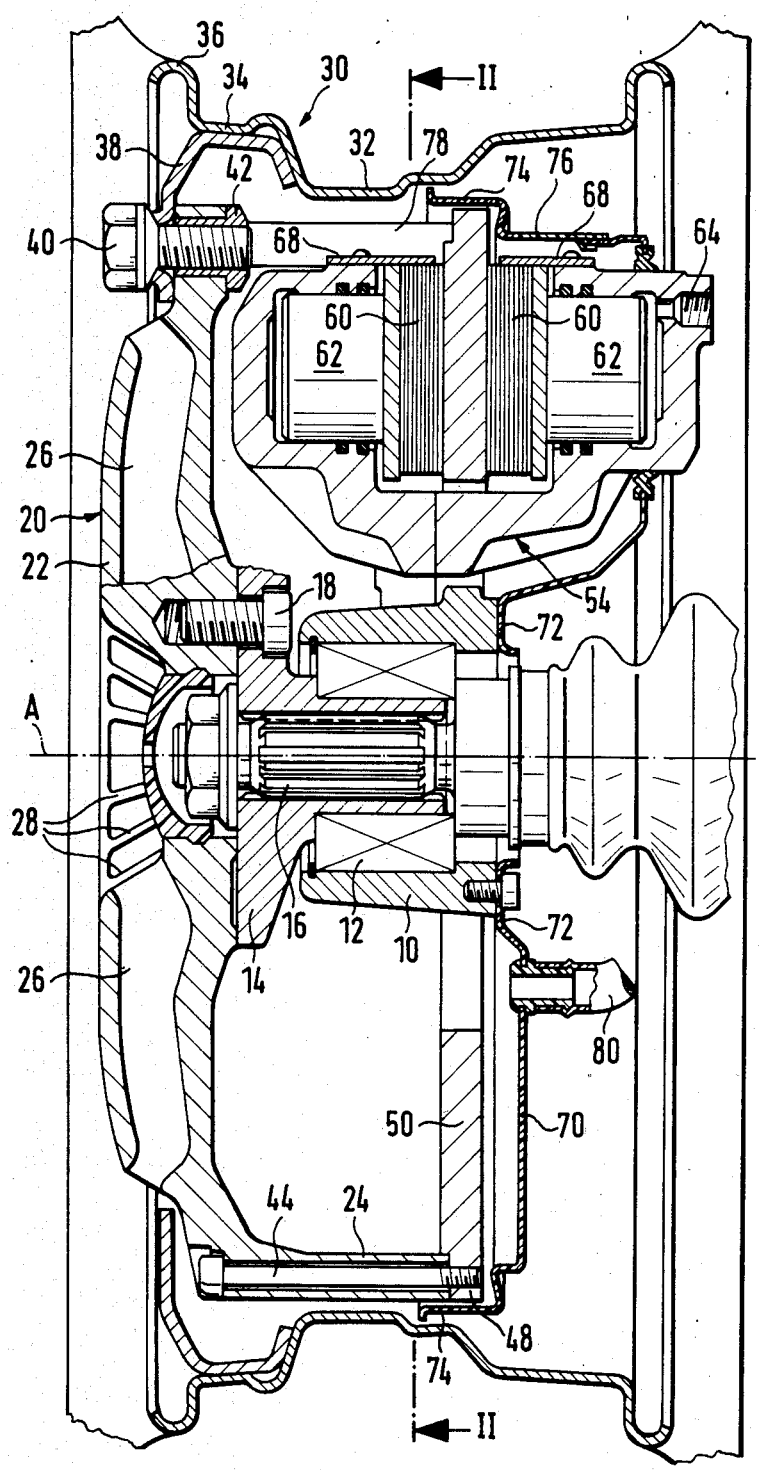
FIG. 1 is an axial section of a first embodiment of the wheel assembly according to the invention.
Figure 2:
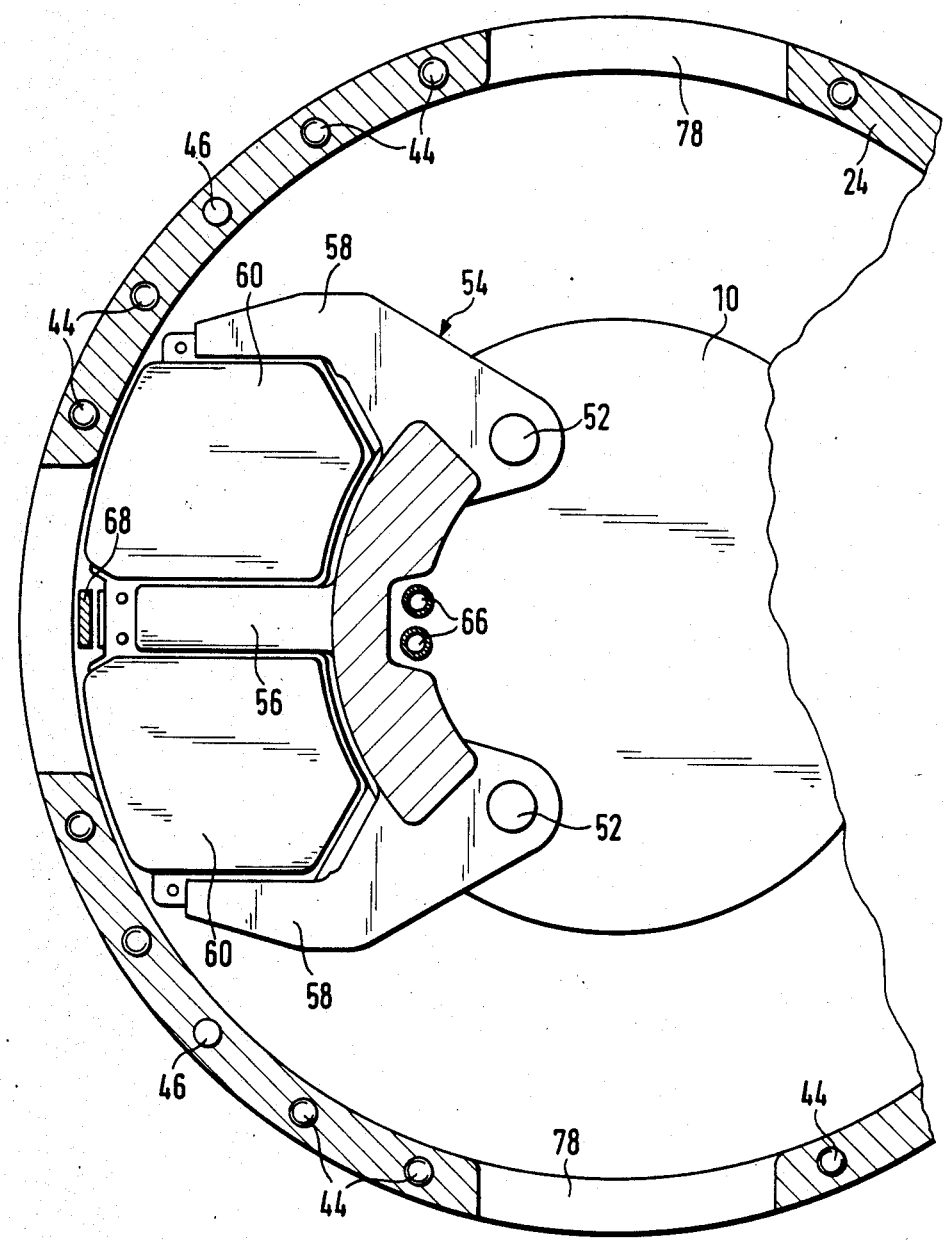
FIG. 2 is the radial section II—II in FIG. 1.

The wheel assembly shown in FIGS. 1 and 2 is associated with a wheel bearing box 10 in which a wheel hub 14 is supported to be driven in rotation about an axis A by means of wheel bearings 12 which are merely indicated. The wheel hub 14 is connected firmly with a journal 16, on the one hand, and by means of screws 18 with a disc carrier 20.

The disc carrier 20 is cup shaped and has a base member 22 extending substantially normal with respect to the axis A and a cylindrical drum-type member 24 which is coaxial with axis A. The base member 22 is formed with vent passages 26 which extend substantially radially and are curved, if desired. They are defined with respect to one another by ventilation blades 28 and covered in both axial directions so that, in cross section, they are fully enclosed by material of the disc carrier 20 which is a light metal casting in the case of the embodiment illustrated.

The disc carrier 20 is surrounded by a wheel rim 30 which comprises a rim base 32 slightly spaced radially outside of the drum-type member 24 and a shoulder 34 at either side of the base as well as a wheel flange 36. These rim portions are produced in the usual manner as an integral steel sheet structural element. The wheel rim 30 further comprises a foot portion 38 which is welded to the base 32 as well as the left shoulder 34 in FIG. 1, being the outer one with respect to the vehicle, and extends substantially radially inwardly within the outer wheel flange 36.

The foot portion 38 is fastened to the disc carrier 20 by bolts 40 of the kind used for the fastening of wheels. The bolts 40 are screwed into threaded steel sleeves 42 inserted axially from the inside into the radially outer edge of the base member 22. In this manner the base member 22 forms a web of a wheel.

The drum-type member 24 is formed with through bores in a paraxial arrangement of four groups, and a necked-down bolt 44 each is inserted through said bores. Furthermore, at least two set pins 46 are inserted in the drum-type member 24 with the axes arranged in parallel. These bolts 44 and pins 46 serve to fasten a stepped outer marginal portion 48 of an otherwise planar, annular brake disc 50 to the drum-type member 24.

A brake caliper 54 comprising a radial central web 56 and two outer arms 58 in parallel with the same is fixed to the wheel bearing box 10 by a pair of bolts 52. The central web 56 and the outer arms 58 straddle the radially inner edge of the brake disc 50 and receive a pair of brake pads 60 each between them at either side of the brake disc. In the embodiment shown in FIGS. 1 and 2 the brake caliper 54 is of the fixed caliper type which comprises a pair of hydraulic actuating devices 62 each at either side of the brake disc 50. The two actuating devices 62 at the right side in FIG. 1, being the inner side with respect to the vehicle, each are furnished with a hose connection 64 for brake hoses of a dual circuit brake system and connected by separate pipe lines 66, as shown in FIG. 2, to the corresponding actuating device 62 at the other side of the brake disc 50.

Each pair of brake pads 60 is prevented by a corresponding centrally positioned hold-down spring 68 from making radial movements.

The wheel bearing box 10, base member 22, and rim base 32 define an annular space which houses the brake described. This annular space is bounded axially inwardly with respect to the vehicle by a thin and correspondingly light wall 70 made of stiff sheet metal or plastics. The wall 70 has a radially inner edge 72 connected by screws to the wheel bearing box 10 and an axially outer substantially cylindrical collar 74 which extends coaxially with the brake disc 50 at a small radial spacing from the outer edge 48 and over the neighboring area of the drum-type member 24, establishing a heat barrier with respect to the rim base 32.

In the range of the brake caliper 54 the wall 70 is formed with an axially inwardly directed convexity and in the radially outer area at that location it has a sliding window 76 permitting the exchange of the axially inner brake pads 60. Exchange of the axially outer brake pads 60 is permitted by a plurality of recesses 78, being four in the embodiment shown, which are provided in the drum-type member 24 at uniform circumferential spacings from one another. The bolts 40 are loosened and the rim 30 is withdrawn together with the corresponding tire in order to replace the brake pads 60.

A vent pipe 80 is attached to the wall 70 to permit air to be sucked out of the annular space mentioned. To this end the vent pipe 80 is connected, for example, to a venturi tube in the exhaust gas system of the corresponding motor vehicle whereby the necessary vacuum always will be available when the engine is running.

Figure 3:
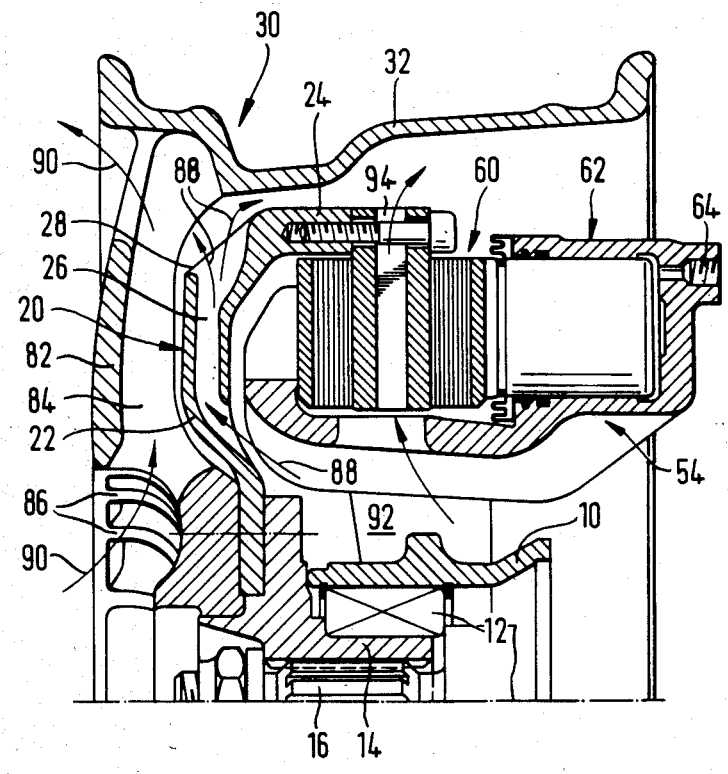
FIG. 3 is an axial section, shown only one-sidedly, of a second embodiment of the wheel assembly according to the invention.

The embodiment according to FIG. 3 differs from the one shown in FIGS. 1 and 2 substantially in that the wheel rim 30 is not supported by the disc carrier 20 but instead by a conventional independent wheel web 82 fixed to the wheel hub 14 together with the base member 22 of the disc carrier 20. Additional vent passages 84 are formed between the base member 22 and the wheel web 82 and delimited by substantially radial ventilation blades 86.

As seen in FIG. 3, during operation an air stream marked by arrows 88 enters into the radially inner ends of the vent passages 26, in axial direction from the inside to the outside, and leaves the radially outer ends thereof, partly in axial inward direction and partly axially outwardly. As regards the vent passages 84, on the other hand, air flows through them in accordance with the arrows 90, this air is aspired from the axially outer side of the wheel web 82 and also discharged to the same outer side.

According to FIG. 3 the brake caliper 54 is guided for axial floating at a brake carrier 92 fixed to the wheel bearing box 10. Only one hydraulic actuating device 62 is arranged at this brake caliper 54. Also the embodiment shown in FIG. 3 could be provided with a fixed caliper of the type presented in FIGS. 1 and 2 instead of such a floating caliper 54. And, vice versa, also the embodiment according to FIGS. 1 and 2 could comprise a floating caliper.

As shown in FIG. 3 a third cooling passage 94 may be provided through the brake disc.

What is claimed is:

1. A wheel assembly having axially spaced inner and outer sides and a wheel web (82) fixed to a wheel hub (14) and having axially spaced inner and outer faces, said assembly including a disc brake consisting of a cup-shaped disc carrier (20) which has a base member (22) also secured to said wheel hub (14) and a drum-type member (24) extending axially inwardly at a small radial spacing from the inner surface of a wheel rim (30) and being firmly connected to the radially outer edge (48) of a brake disc (50), a brake caliper (54) supported at a stationary wheel bearing box (10) and straddling the radially inner edge of the brake disc (50), supporting brake pads (60) disposed at either side of the brake disc, and comprising an actuating device (62) at least at one side of the brake disc (50), and first vent passages (26) within the base member and spaced radially inwardly from said wheel rim (30), said base member (22) being of double wall design to define an inner chamber which is subdivided into said vent passages (26) by ventilation blades (28) which are at least approximately radial, and second substantially radial vent passage (84) formed between said double-walled base member (22) and the inner face of said wheel web (82), said first and second vent passages having respective radial inner and outer open ends and being independent of each other whereby in operation two independent air streams (88, 90) are generated.

2. The wheel assembly as claimed in claim 1, wherein the inner and outer ends of said second vent passages (84) open at the axially outer face of said wheel web (82) and said second passages are separated from one another by ventilation blades (86) which are formed on the axially inner face of the wheel web (82) and extend axially at least approximately as far as the double-walled base member (22).

3. The wheel assembly as claimed in claim 1, wherein the radial outer ends of the respective first and second vent passages (26) (84) communicate with each other whereas the radial inner ends of the respective passages are separate from each other.

4. The wheel assembly as claimed in claim 1, wherein the inner and outer ends of said second vent passages (84) open towards the axially outer side of said wheel assembly and wherein the radial inner ends of said first vent passages (26) open towards the axially inner side of said wheel assembly and the radially outer ends open in the direction of the axially outer side of said wheel assembly whereby the radial outer ends of the respective first and second vent passages (26) (84) communicate with each other whereas the radial inner ends of said respective passages are separate from each other.

5. The wheel assembly as claimed in claims 1 and 4 including a third cooling passage (94) through said brake disc.

6. A wheel assembly including a disc brake for vehicles, comprising a cup-shaped disc carrier (20) which has a base member (22) secured to a wheel hub (14) and a drum-type member (24) extending axially inwardly at a small radial spacing from the inner surface of a wheel rim (30) and being firmly connected to the radially outer edge (48) of a brake disc (50), a brake caliper (54) supported at a stationary wheel bearing box (10), straddling the radially inner edge of the brake disc (50), supporting brake pads (60) disposed at either side of the brake disc, and comprising an actuating device (62) at least at one side of the brake disc (50), and first vent passages (26) within the base member and spaced radially inwardly from said wheel rim (30), said base member (22) being of double wall design to define an inner chamber which is subdivided into said vent passages (26) by ventilation blades (28) which are at least approximately radial, wherein said disc carrier (20) together with the wheel rim (30) and an axially inner wall (70) fixed to the wheel bearing box (10) define a space which contains the brake disc (50) and at least a substantial part of the brake caliper (54) and is connected to a vent pipe (80), said axially inner wall (70) including a collar (74) which encloses the radially outer edge (48) of the brake disc (50) and the adjoining area of the drum-type member (24), and forms a heat barrier with respect to said inner surface of said wheel rim (32).

* * * * *